US 6,546,416 B1

(12) United States Patent
Kirsch

(10) Patent No.: US 6,546,416 B1
(45) Date of Patent: Apr. 8, 2003

(54) METHOD AND SYSTEM FOR SELECTIVELY BLOCKING DELIVERY OF BULK ELECTRONIC MAIL

(75) Inventor: Steven T. Kirsch, Los Altos, CA (US)

(73) Assignee: Infoseek Corporation, Burbank, CA (US)

( * ) Notice: Subject to any disclaimer, the term of this patent is extended or adjusted under 35 U.S.C. 154(b) by 0 days.

(21) Appl. No.: 09/208,330

(22) Filed: Dec. 9, 1998

(51) Int. Cl.$^7$ ............................................. G06F 13/00
(52) U.S. Cl. .................... 709/206; 709/219; 709/225; 713/201
(58) Field of Search ................................ 709/203, 204, 709/206, 219, 223, 224, 225, 313; 713/201

(56) References Cited

U.S. PATENT DOCUMENTS

| | | | | | |
|---|---|---|---|---|---|
| 5,619,648 A | * | 4/1997 | Canale et al. | ............... | 709/206 |
| 5,796,840 A | * | 8/1998 | Davis | ........................... | 380/50 |
| 6,023,723 A | * | 2/2000 | McCormick et al. | ....... | 709/206 |
| 6,052,709 A | * | 4/2000 | Paul | ........................... | 709/202 |
| 6,195,698 B1 | * | 2/2001 | Lillibridge et al. | ......... | 709/225 |
| 6,199,102 B1 | * | 3/2001 | Cobb | ........................... | 709/206 |
| 6,266,692 B1 | * | 7/2001 | Greenstein | ................... | 709/206 |
| 6,324,650 B1 | * | 11/2001 | Ogilvie | ........................ | 713/202 |

FOREIGN PATENT DOCUMENTS

| | | | | |
|---|---|---|---|---|
| WO | WO 99/10817 | * | 4/1999 | ........... G06F/17/00 |

* cited by examiner

Primary Examiner—Viet D. Vu
(74) Attorney, Agent, or Firm—David E. Lovejoy; Donald L. Wenskay

(57) ABSTRACT

The origin address of an e-mail message is validated to enable blocking of e-mail from spam e-mail sources, by preparing, in response to the receipt of a predetermined e-mail message from an unverified source address, a data key encoding information reflective of the predetermined e-mail message. This message, including the data key, is then issued to the unverified source address. The computer system then operates to detect whether a response e-mail message, responsive to the challenge e-mail message, is received and whether the response e-mail message includes a response key encoding predetermined information reflective of a predetermined aspect of the challenge e-mail message. The unverified source address may be recorded in a verified source address list. Thus, when an e-mail message is received, the computer may operate to accept receipt of a predetermined e-mail message on condition that the source address of the predetermined e-mail message is recorded in the verified source address list and alternatively on condition that the predetermined e-mail message includes the response key.

24 Claims, 4 Drawing Sheets

METHOD AND SYSTEM FOR SELECTIVELY BLOCKING DELIVERY OF BULK ELECTRONIC MAIL

BACKGROUND OF THE INVENTION

1. Field of the Invention

The present invention is generally related to systems and methods of managing communications by electronic mail and, in particular, to a method and system for detecting and blocking the receipt of unsolicited commercial electronic mail.

2. Description of the Related Art

With the expansion of the Internet as a medium for the transport of electronic mail (e-mail), an advertising practice of sending unsolicited commercial e-mail (UCE or "spam") has developed as an annoyance to other uses and users of the Internet. Indeed, the volume of UCE received by an e-mail recipient may regularly be a substantial percentage of all e-mail received.

Bulk e-mailers, as the sources of UCE are commonly referred to, utilize the resources of the Internet itself, including specifically, the Usenet news network, Web based discussion groups, Web based indices of users and organizations, and other public or pseudo-public information sources to gather e-mail addresses. E-mail address lists are also available for purchase from various organizations who at least purport to provide targeted lists. The quality of targeted lists, however, tends to degrade rather quickly over time due to the fluid nature of the Internet and the changing interests of Internet users. Consequently, there is an obvious interest by the bulk e-mailers to oversubscribe their mailing lists with any and all e-mail addresses that are possibly relevant targets for the content of any particular UCE.

There is also little commercial constraint limiting the lowering of the relevancy threshold used by bulk e-mailers due to the beneficial cost structure that most bulk e-mailers enjoy. The only actual cost to the bulk e-mailer for sending additional UCE is, at most, the incremental cost of acquiring additional e-mail addresses and the incremental connection cost required to send a UCE message. Many higher bandwidth Internet connections are structured for continuous availability at a fixed fee. Bulk e-mailers with these types of connections therefore effectively incur no additional cost for sending UCE to as many e-mail addresses they have acquired.

Fortunately, there is at least one significant non-economic, or at least not directly economic, cost-of-business faced by bulk e-mailers. Internet access for all users is channeled through Internet Service Providers (ISPs) at some level. As predominantly service oriented organizations, these ISPs are usually responsive to complaints from the general Internet public concerning excessive UCE being sent from any domain serviced by a particular ISP or from a subscriber ISP site served by a higher level ISP. Often, ISP service agreements include contractual prohibitions restricting their subscriber sites and user domains from sending UCE.

Bulk e-mailers, however, have responded by utilizing various techniques to obscure the source of the UCE they send in order to avoid the identification that would lead to limits on their activities. Conventionally, Internet e-mail messages include a header section that includes multiple required and optional lines of information including the source and destination addresses of an e-mail message. Typical required lines include From, To, Message-ID, and X-Mailer. Optional lines include Reply-To, Organization, and Return-Path. Additional required header lines, denominated Received, are added to the message as the message passes through the mailer sub-systems of ISPs and other computer systems as necessary to reach a destination domain user. These Received lines are nominally beyond the control of individual bulk e-mailers. The definition and use of these header fields is specified in Request for Comments (RFCs)/Standards (STDs) documents 821/10, 822/11, and 974/14, among others, which are publicly available from multiple sources on the Internet.

Bulk e-mailers use anonymous mailers and re-mailers to obscure the required e-mail header lines of their UCE by specifying non-existent e-mail systems and accounts. Modified mailers can be used to completely remove header lines or to substitute addresses of known valid Internet e-mail accounts that are not actually associated with the bulk e-mailer.

These techniques are generally sufficient to prevent the UCE recipients from being able to identify and complain to the postmaster of the relevant ISP about the activities of a bulk e-mailer. While the Received lines provide traceable information, the complexity of filtering through this information is usually beyond the level of effort that most UCE recipients will undertake. Even for those that do, the number of public complaints actually received by the ISP is significantly reduced, often allowing the bulk e-mailer to remain in operation, if only for a longer period of time before being forced to find a new ISP to use for their activities.

A variety of techniques have been developed in the recent past to deal with the growing amount of UCE being received by Internet e-mail users. These techniques primarily include e-mail client systems supporting manual e-mail accept and reject lists, automated context analysis, use of public shared lists of known spam sources, and direct challenge systems. None are completely effective and all impose an additional degree of operating complexity on the e-mail client user to varying degrees.

The typical e-mail accept and reject list approach, as used in the ProntoMail® e-mail client, provides for lists of e-mail addresses that are used as gate filters against incoming e-mail. E-mail with addresses on the accept list are passed, while messages with addresses on the reject list are discarded; the reject list is a blocking filter. By default, e-mail addresses not on either list are presented to the user to determine which list to add the address to. As a result, the user sees all of the UCE that originates from any address that is new to the user's e-mail client. Since the bulk e-mailers to hide or frequently change their return e-mail addresses, almost all of the UCE is seen by the e-mail client user.

Automated context analysis, such as implemented by DeadLetter®, a Eudora® plug-in, relies on key word usage and various patterns of advertisement pitches to discern UCE from other e-mail. Suspected UCE is automatically discarded or, more typically, directed to an alternate e-mail in-box of the client. Since the analysis is not and as a practical matter cannot be perfect, desired e-mail may be mis-characterized. Therefore, the user is generally required to manually review the messages in the alternate e-mail in-box anyway. E-mail mis-characterized such that it is unrecognized as UCE winds up in the standard in-box. Thus, this technique functions only as an imperfect segregating filter against UCE, rather than a blocking filter.

Public shared lists, manually developed and currently maintained by only a few large organizations, such as AOL®, can be automatically referenced by modified e-mail clients. These lists are used as simple reject lists, thus supporting the implementation of blocking filters. Unfortunately, large organizations are required as a practical matter to develop and maintain these lists. There is no guarantee that these organizations will continue to publically disseminate these lists, particularly in view of the cost of the preparation and maintenance of the lists. Even so, these lists are almost by definition out of date due to the necessary delay in their compilation. In contrast, the techniques of the bulk e-mailers tend to rapidly obsolete the lists.

The foregoing filtering systems are basically passive or receptive in nature. These systems operate to actively filter e-mail as received, but they are passive with regard to using the larger Internet to provide some basis or support for implementing their blocking filters. A challenge system, such as used by the MailGuard® e-mail client, "actively" issues an e-mail response to any e-mail received from an address that is not identified on an accept list. That is, the challenge system typically maintains and uses accept and reject lists similar to ProntoMail®, but adds the automatic challenge issuance for mail from unknown addresses. If the response to the challenge e-mail is acceptable, as determined by the client user, the previously unknown e-mail address is added to the accept list. Thus, the challenge system, and other similarly active systems, are generally more accurate than others in discriminating between UCE and desired e-mail. This accuracy, however, comes at the price of greater client user involvement in the discrimination process. This increased involvement is viewed as both unavoidable and a substantial and undesired penalty characteristic of active challenge type systems. Consequently, the relatively "passive" blocking filter systems are conventionally viewed as far more desirable despite their recognized shortcomings.

There is therefore a clear need for an improved UCE oriented blocking filter that can be implemented by Internet e-mail clients.

SUMMARY OF THE INVENTION

Thus, a general purpose of the present invention is to provide an efficient and accurate UCE oriented blocking filter for use by Internet connected e-mail clients.

This is achieved in the present invention by providing for the operation of a computer, for the purpose of validating the origin address of an e-mail message to enable blocking of e-mail from bulk e-mail sources, by preparing, in response to the receipt of a predetermined e-mail message from an unverified source address, a signature data key encoding information reflective of some aspect of the predetermined e-mail message. This e-mail message, including the data key, is then issued to the unverified source address. The computer system then operates to detect whether an e-mail message, responsive to the challenge e-mail message, is received and whether this response e-mail message includes a response key encoding predetermined information reflective of the predetermined aspect of the challenge e-mail message.

The present invention may further provide for the recording, in response to receipt of the response key, the unverified source address in a verified source address list. Thus, when an e-mail message is received, the computer according to the present invention may operate to accept receipt of a predetermined e-mail message on condition that the source address of the predetermined e-mail message is recorded in the verified source address list and alternatively on condition that the predetermined e-mail message includes the response key.

An advantage of the present invention is that it provides for an active challenge system that has a high degree of accuracy in identifying UCE.

Another advantage of the present invention is that the operable methods of the active challenge system require minimal user involvement in order to function.

A further advantage of the present invention is that the method of the challenge system is highly tolerant of other UCE blocking and segregating systems in sustaining operation of the present invention without compromise of accuracy or automatic operation.

Still another advantage of the present invention is that the active challenge signature can be readily established to support an expiration condition or threshold on or beyond which UCE attempting to pass as challenge responses will not be accepted.

Yet another advantage of the present invention is that client e-mail systems may be easily modified to utilize the methods of the present invention. The e-mail client modifications require no modification to ISP mailers or re-mailers. A modified e-mail client can fully interoperate with unmodified e-mail clients and still successfully implement the active challenge response system of the present invention.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein.

DETAILED DESCRIPTION OF THE INVENTION

Figure 1:
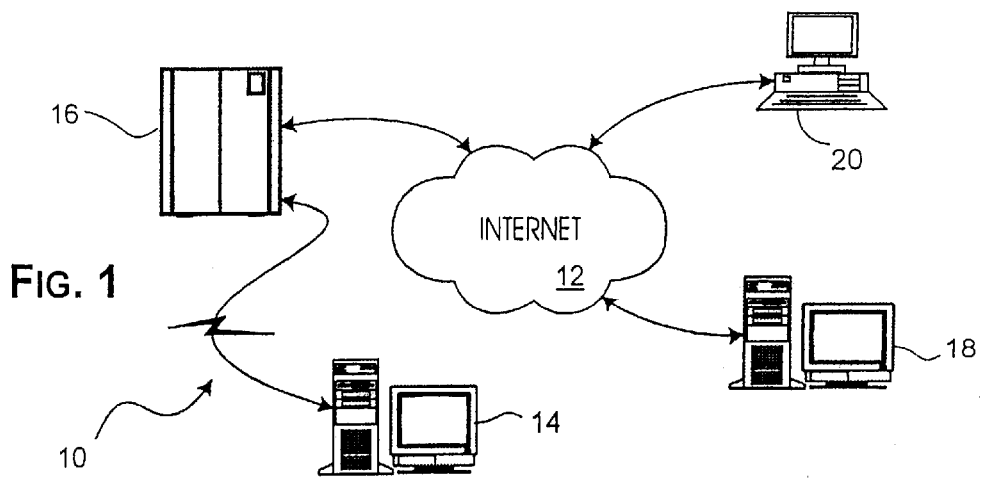
FIG. 1 is a simplified block diagram of computer systems implementing e-mail clients and mailers interconnected through the Internet.

The generalized physical embodiment 10 of the information environment generally referred to as cyberspace is shown if FIG. 1. An Internet 12 provides the logical interconnection for a variety of client computer systems, such as a computer system 14, to connect through the transmission and reception of electronic mail, among other forms of information, with other client computer systems 18,20. The computer system 14 typically connects through any of a variety of different telephony technologies to a server computer system 16 operated by an Internet service provider (ISP) that connects directly or through higher level ISPs, as needed, to reach the backbone computer systems that make up the Internet 12. Other computer systems such as systems 18, 20 typically connect through the same or other ISPs (not shown) in order to logically connect with the Internet 12.

Unsolicited commercial e-mail (UCE), commonly referred to as spam, may be generated through bulk e-mail deliveries from a computer system, such as the computer system 18, to the Internet 12. Conventionally, UCE routes through the Internet 12 as ordinary e-mail, spooled by ISPs 16 ultimately for delivery to identified destination computer systems 14. The return e-mail address is intentionally obscured to avoid self-identification. The bulk e-mailer operating the system 18 can easily control the removal of the From: line of the e-mail messages, substitute a non-existent return e-mail address, or substitute a valid e-mail address corresponding to an unrelated computer system, such as the system 20. Thus, while the user of a computer system 14 can attempt to identify and complain to the postmaster of an ISP providing service to a bulk e-mailer, there is both difficultly and uncertainty by the user of the computer system 14 to properly identify the relevant ISP. Further, the user of the computer system 14 has little or no authoritative or commercial position to have an ISP, other than perhaps their own ISP 16, limit the activities of a bulk e-mailer.

E-mail System Overview

Figure 2:
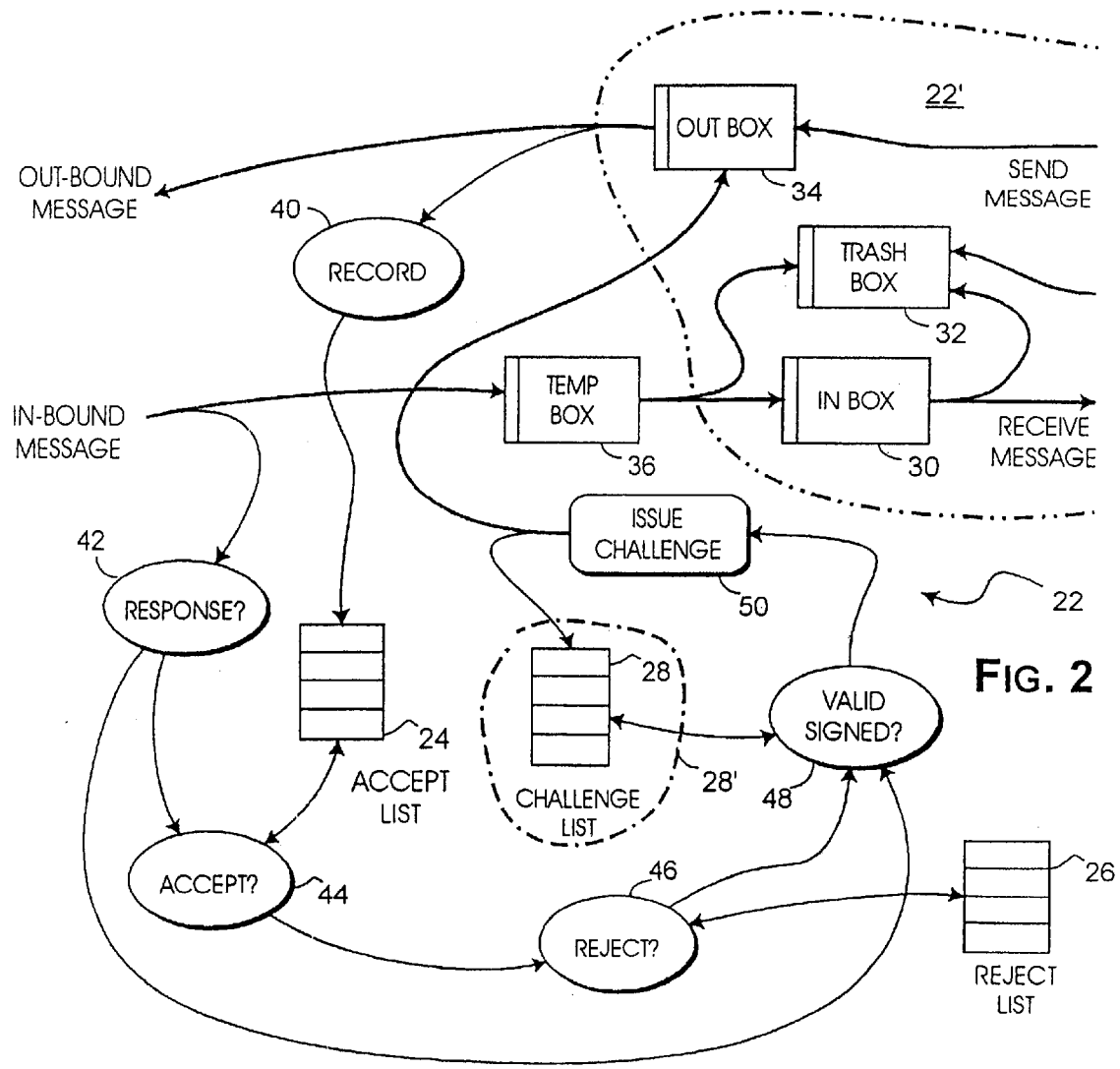
FIG. 2 is a flow and transition diagram illustrating the process and data transition structures of a preferred embodiment of the present invention.

As shown in FIG. 2, an e-mail system 22 that implements the present invention can actively identify and filter UCE. Through the implementation of the system 22, the user of a computer system 14 is able to efficiently block UCE originated from a computer system 18 independent or in collaboration with UCE filtering actions, if any, taken by the ISPs interconnecting the system 18 with the Internet 12. This is achieved while preserving the ability of the system 14 to exchange e-mail with other computer systems, such as the computer system 20.

The e-mail filter system 22 generally includes or interoperates with a conventional e-mail client system 22'. Inbound e-mail messages are conventionally received in an inbox 30 for subsequent review by the user of the local computer system executing the client system 22'. These e-mail messages may be transferred, upon review, directly to a discard or trash box 32 or transferred elsewhere within the e-mail client computer system. Similarly, e-mail messages originated by the e-mail client system 22' are queued to an outbox 34 to pend delivery to an ISP.

In general, the active e-mail filtering system 22 operates as an interface between the e-mail client system 22' and, typically, a point-of-presence (POP) system conventionally hosted by an ISP 16. This interface function can be implemented in a variety of forms dependant largely on the available operative features of the e-mail client 22'. For example, where supported, the active e-mail filtering system 22 is preferably implemented as a "plug-in" component that integrates into the operative function of the client 22'. Alternately, the e-mail filtering system 22 can be implemented as a software layer over the POP communications port defined for use by the e-mail client 22'. In this alternate embodiment, the e-mail filtering system 22 software layer can be provided on any computer system logically in the communications path used by the e-mail client 22' to access the POP system hosted by the ISP. Specifically, the software layer embodiment of the e-mail filtering system 22 can be implemented on either the ISP 16 or client computer systems 14. Implementation on the ISP or a third party computer system 20 allows the e-mail filtering system 22 to be operated as a service for the benefit of a subscribing e-mail client 22'.

The function of the e-mail filter system 22, in accord with a preferred embodiment of the present invention, is to actively select to accept or reject e-mail messages received by the system 22. Accept 24 and reject lists 26 are kept for this purpose. Additionally, the system 22 operates to identify and challenge e-mail messages from correspondents that are not known to the system 22. The challenge is presented as an automated reply to an e-mail message from an unknown e-mail address, which is generally defined as an address not found on either the accept 24 or reject 26 e-mail address lists other well-known and conventionally existing e-mail addresses including those, for example, of the host domain of the e-mail client 22' may be inferred to be a known address, though not explicitly listed.

In accordance with the preferred embodiment of the present invention, the challenge message is generated automatically by the active challenge system 22 directly in response to the unknown e-mail message received. The challenge request message preferably includes a text statement and a digital signature. The statement preferably identifies the challenge e-mail message as an identification verification message and presents a request for a specific response to the challenge message be returned to the e-mail client system 22. Although the specific response could be as simple as merely replying to the challenge message, in order to discriminate against auto-responders the specific response requested preferably includes directions to, for example, reply to the challenge message with a blank subject line. Other individual and additional trivial modifications to the message—such as placing an X between two brackets, deleting a portion of the challenge text, or entering a random four digit number—or the addition of some specific information—such as the name of a state capital or lead character of a movie—could be requested in order to distinguish from and defeat auto-responders being statically programmed to make any single requested modification. Also, the specific modification requested may be cycled among a number of such modifications by the active e-mail filtering system 22 in order to effectively randomize the modification request received by any particular auto response system. Since preferably, all of the specific modifications requested are cognitive, yet trivial, little burden is placed upon the actual e-mail correspondents in order to establish a lasting level of trust between the correspondent and the active e-mail filtering system 22.

The signature provided in the challenge message may be formed utilizing a conventional encoding or encrypting technology. For example, a simple check-summing algorithm may be utilized to generate the signature value based on the whole of the challenge message, or some predefined portion. Other encoding and encrypting algorithms usable with the present invention include MD5, ROT13 and Public Key Encryption. In a preferred embodiment of the present invention, the signature value is generated based on a check-sum generated utilizing the challenge request statement as the source text. An embodiment of the present invention, which may ultimately be preferred, alternately or additively generates the signature as an encrypted text block containing a variety of specific information. This information preferably includes the origination date and time of the challenge message, the e-mail address used as the destination for the challenge message, and an identifier of the message for which this challenge message was generated. By including such specific information in the encrypted text block, analysis and evaluation of any responding message received back by the e-mail client 22 can be performed. Specifically, utilization of the encrypted signature on e-mail messages originated after some threshold period of time beyond the signature origination date can be readily identified. The disposition of such late responses can then be intelligently handled by the active e-mail filtering system 22. Of course, the window of time within which an encrypted signature is automatically accepted is definable entirely within the operation of the active e-mail filtering system 22.

The challenge e-mail message is sent to the unknown e-mail address with the intent of obtaining a validating response. If the unknown e-mail address is not valid, only auto-responds, or simply does not answer, whatever response received by the e-mail system 22 can be discriminated as a non-validating response. Conversely, a validating response will minimally require a cognitive modification be made to an otherwise conventional reply to the challenge message, which will include the digital signature by default.

The signature must be included in the reply for the response to be recognized potentially as a challenge reply independent of any evaluation against the accept and reject lists. Messages recognized based on the included signature are then evaluated for cognitive compliance as validating responses. When determined to be non-validating, the response and the original message that was challenged are preferably discarded. As an option, the unknown e-mail address can also be placed on the reject list. Conversely, a validating response results in the discard of only the validating response itself. The previously unknown e-mail address is added to the accept list and the original message challenged is then passed to the e-mail client system 22' as a non-UCE e-mail message.

E-mail Message Processing

In greater detail, a preferred embodiment of the present invention adds to the conventional e-mail client system 22' an accept list 24, reject list 26, and a challenge list 28. This challenge list 28 may be alternatively provided as separate challenge list 28 data structure or a data store extension 28 of a temporary or pending in-box 36 structure. The pending box 36 may also be implemented logically within the inbox with suitable modification to the otherwise conventional e-mail client system 22' to accommodate the identification of e-mail messages logically residing with in the pending box 36. This may be accomplished by augmenting the status value associated with each e-mail message with an additional state recognizable as identifying a corresponding e-mail message as pending filtering evaluation by the present invention.

The accept and reject lists 24, 26 provide storage for respective lists of e-mail addresses preferably on the local e-mail client computer system 14. The form of the addresses as stored may include simple domain names, specific user e-mail addresses, and Internet protocol (IP) numbers. Inclusion and exclusion operators, wildcards and IP range lists may also be utilized in the parsing or other evaluation of the accept and reject lists address. The use of such operators, wild cards and lists in considering whether a specific e-mail address matches an entry in a list of e-mail addresses is known. Thus, conventional evaluation of whether a particular e-mail address matches an entry on either the accept list 24 or the reject list 26 is utilized by the present invention.

The challenge list 28 may provide storage for destination e-mail addresses of challenge messages sent (not required), identifiers of the temporarily stored messages that are being challenged (can be input from the construction of the challenge list 28' as part of the pending box 36), and certain additional information pertaining to the individual challenge messages, such as the signature encoding key and cognitive response expected for each challenge message (may alternately be determined algorithmically upon evaluation of the challenge reply message). The use of operators, wildcards, or lists are preferably not necessary in specifying e-mail address entries on the challenge list 28. Since the list 28 operates as a temporary store of information concerning the currently outstanding challenges issued by the system 22, the matching of e-mail addresses by the e-mail client system 22 against the entries in the challenge list 28 will preferably be on an exact basis.

In this preferred embodiment of the present invention, inbound e-mail messages are placed in the pending box 36 while the received e-mail message is evaluated. Selected e-mail messages, determined according to the present invention, are ultimately transferred from the pending box 36 to the inbox 30, where subsequent handling and evaluation of the e-mail message is performed in a conventional manner.

When an inbound e-mail message has been stored in the pending box 36, the content of the e-mail message is optimally evaluated algorithmically in a process step 42 to determine whether the e-mail message may be an a response to a challenge message originated by or on behalf of the client e-mail system 22'. This determination is made at least in part by scanning the content of the response message for text that appears to be a digital signature consistent with the present invention and text corresponding to the cognitive request. Thus, auto-responses and administrative responses that contain copies of the challenge messages they answer will be detected as potential challenge response messages.

Messages identified as potential challenge response messages are passed to a process step 48 that operates to determine whether the digital signature is valid and whether the cognitive request presented by the particular challenge message has been appropriately answered. In performing this function, the challenge list 28 may be referenced to obtain the information necessary to decode the digital signature and to qualify the cognitive response.

If the digital signature is invalid or if the cognitive response is incorrect, the challenge response message and the received e-mail message that was challenged are both discarded. Conversely, if the digital signature and cognitive response are validated, only the challenge response message is discarded and the challenged e-mail message is placed in the inbox 30 for conventional processing. The e-mail address of the challenged message is also placed on the accept list 24.

E-mail messages not recognized as challenge reply messages at step 42, and all messages if the step 42 is not used, are then considered at step 44 to determine whether the From or Reply-to address is present on the accept list 24. Where a match is identified, the e-mail message present in the pending box 36 is passed on to the inbox 30 for subsequent conventional processing.

If the accept list match fails at step 44, a reject step 46 is invoked to determine whether an address match can be found against the reject list 26. If a reject list match is found, the corresponding e-mail message in the pending box 36 is discarded or, in a preferred embodiment of the present invention, passed to the discard box 32 for subsequent conventional processing.

If a reject list match is not found, the message content is preferably evaluated partially through the step 48 to determine whether, for example, a known correspondent is replying to an e-mail message originated from the system 22', but replied to from an e-mail account not previously seen by the system 22'. Since out-bound messages from the e-mail user of the system 22 are preferably provided with digital signatures, responses to such messages are validated and thus are shown to the user when they are received. As before, the digital signature preferably encodes the date that the message was sent. Thus, the step 48 can be set to invalidate messages received beyond a nominal reply period determinable by the e-mail user of the system 22. Preferably, messages containing expired digital signatures are discarded or put in the trash box 32; validated messages are passed to the inbox 30. In a preferred embodiment of the present invention, the address of e-mail messages validated only by virtue of a valid digital signature are not placed on the accept list. Rather, no present action is taken regarding messages from this address, thereby permitting the active challenge system 22' to re-evaluate messages received subsequently from that address. The accept list will be updated with this address if, however, the e-mail user chooses to update the list 24 or the e-mail user simply replies directly to this address.

Finally, messages received but not matched to the accept or reject lists and not containing a digital signature are, in a step 50, responded to by the preparation and issuance of a challenge message. This message, once generated to include a cognitive request and a current corresponding digital signature, is placed in the out box 34.

User Account E-mail Message Receipt Processing

Figure 3:
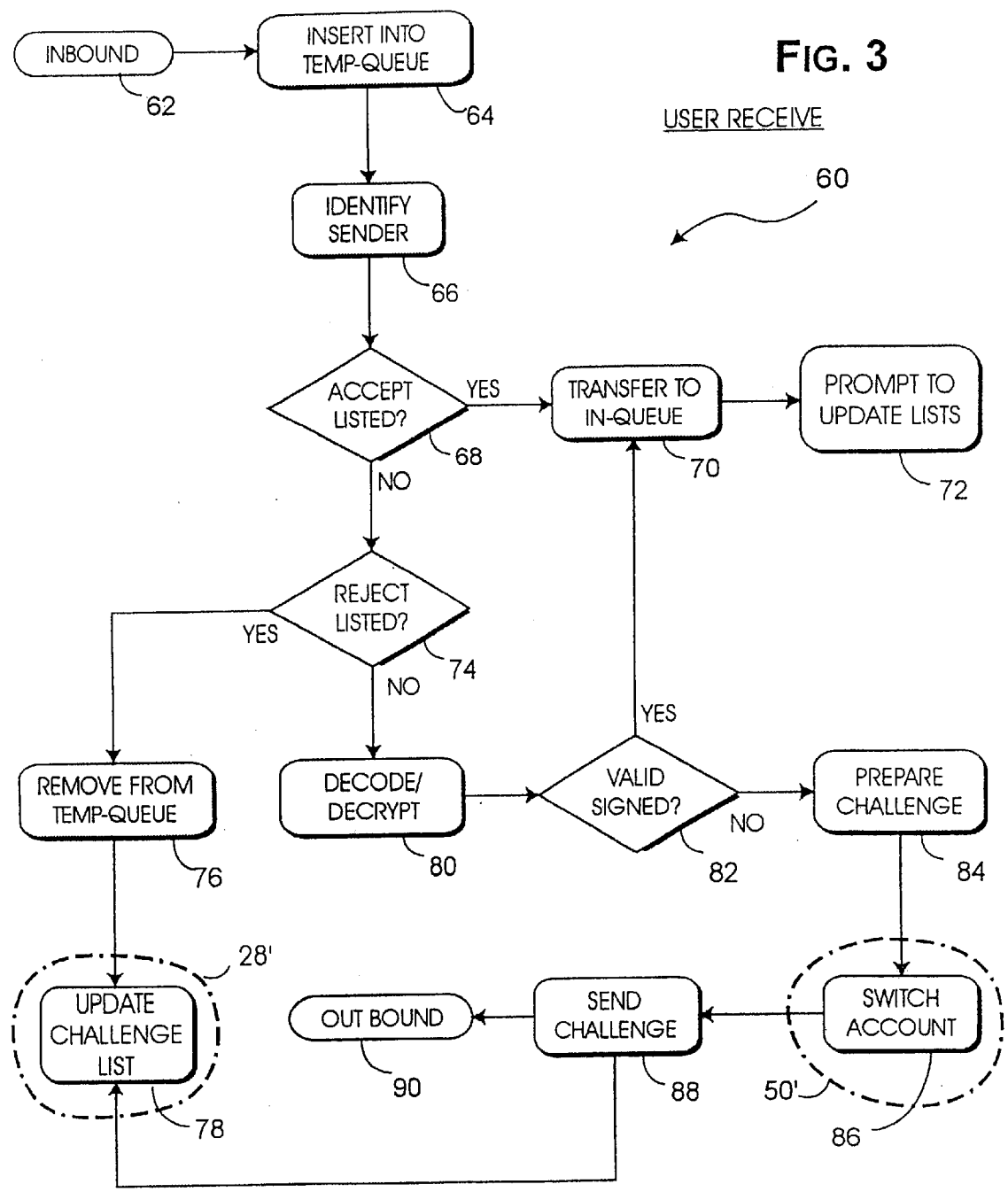
FIG. 3 is a flow diagram illustrating the details of the e-mail user message receipt process in a preferred embodiment of the present invention.

Referring first to FIG. 3, a variety of preferred embodiments and operational variations of the present invention will be described in connection with an active e-mail filtering system 60. These options and variations primarily concern the receipt processing of e-mail and the preparation and transmission of the challenge messages and permit location of the active e-mail challenge system 22, or an autonomous "robot" portion thereof, separate from the conventional e-mail client 22' on an ISP system 16 or other service provider accessible directly or indirectly through the Internet 12. For such embodiments of the present invention, the remote location of the active filtering system 22' or robot relative to a client computer system 14 serves to off-load a possibly substantial level of processing as well as affording a centralized point for management of changes to the accept and reject lists 24, 26. In particular, the centralized management may make the augmentation of the reject list with e-mail addresses obtained from Internet sources of known UCE sources much easier. While centralized maintenance of the lists 24, 26 may, for alternate embodiments of the present invention, prove useful as well as convenient for end users of client computer systems, the present invention in all of its embodiments provides for and correctly handles the accumulation of e-mail addresses, formally from unknown sources, onto the accept and reject lists 24, 26.

For this embodiment 60, e-mail messages directed to the user are received and handled separately from challenge responses, which are directed to and processed by a separate robot. Preferably, the user and robot are set-up in separate e-mail accounts if not also on separate computer systems. Thus, inbound e-mail 62 directed to a user's e-mail account is initially stored in a temporary queue 64. The received e-mail is evaluated 66 to determine the nominal sender of the received e-mail message. Once the sender is identified, the message is further evaluated 68 against the accept list 24. If the sender is on the accept list 24, the received e-mail message is transferred to an input queue 70, which may be a conventional inbox, from the temporary queue.

E-mail messages not validated against the accept list 24 may then be evaluated for potential immediate inclusion of the sender e-mail address on the accept list 24 managed by the system 60. This evaluation is optionally performed to initialize an accept list 24 managed by the system 60. In a preferably limited time frame where such initialization is enabled, sender e-mail addresses are unilaterally added 82 to the accept list 24. Subsequently, the e-mail user may select to move the sender e-mail address to the reject list 26 or merely delete the address. The corresponding e-mail message stored in the temporary queue is also transferred 70 to the input queue. Consequently, the end user of the system 60 is involved in the initial review and categorization of sender e-mail addresses. The end user is also provided the programmable option to terminate the initialization.

E-mail messages not validated from the accept list 24 are then evaluated against the reject list 26. Where the sender e-mail address is present on the reject list 26, the corresponding received e-mail message is discarded 76 from the temporary queue and the challenge list 28' is correspondingly updated Specifically, the evaluation of e-mail messages not yet accepted or rejected, are then evaluated 77 to determine whether the message contains a signature recognizable by the system 60. The signature, where found, is decoded or decrypted 80 depending on the nature of the signature identified. In accordance with alternate preferred embodiments of the present invention, the identification of the signature may depend entirely on an algorithmic evaluation of the signature block itself or upon data included in the challenge list 28'. In the latter circumstance, the challenge list 28', may be used to record information identifying different possible types of signatures and, thereby, the corresponding decoding and decrypting algorithms, the scope of pre-existing content utilized in the generation of the signature, and other information usable in identifying whether the particular received e-mail message and its signature were originated by the system 60. The challenge list 28' preferably also stores a challenge issue date and, implicitly or explicitly, a challenge close date. The issue date is useful for detecting the occurrence of unanswered challenges and removal of any corresponding e-mail message still pending in the temporary queue. The challenge close date can be used to permit the system 60 to establish potentially variable challenge periods, perhaps dependent on the general content of the received e-mail message.

In the preferred embodiments, the decoding and decrypting 80 of the signature. Where the signature is valid and the origin date is sufficiently recent, or within a challenge acceptance threshold established directly or indirectly by the end user of the system 60, the e-mail message is considered valid 82 and is transferred to the input queue 70.

Received e-mail messages that bear a signature but fail in the validation of the signature or are received late relative to the time threshold established directly or indirectly by the end user is identified as invalid signed message 82. The invalid received e-mail message is then discarded 76 from the temporary queue 36. Optionally, such invalid signed messages may be further evaluated to identify the sender e-mail address, which may then be added to the reject list 26. Preferably, this option is established directly or indirectly by the end user of the system 60. Conversely, where a reject list match is not found, the corresponding received e-mail message are further processed at a step 80.

E-mail messages received by the system 60 and not yet dispensed with, by virtue of having digital signature to validate, are presumptively from new e-mail correspondents. In accordance with a preferred embodiment of the present invention, these e-mail messages are those to be challenged to confirm that the correspondents are real, as opposed to likely originating from a bulk e-mailer. [In accordance with at least an alternate embodiment of the present invention, the initial processing of a received e-mail message from an unknown correspondent is handled by preparing a challenge message 84, by switching, logging or modifying the current account information, sometimes referred to as an e-mail profile, 86 in order to establish the preferred content of the header lines that are to be associated with the challenge message and the sending the challenge message 88.] The challenge message itself is prepared 84 with content that presents a cognitive response request, and includes a signature. At this point, the challenge list 28' may be updated 78. The update to the challenge list preferably includes the necessary information to identify the appearance of a signature and enable the decoding or decrypting of the signature as necessary to subsequently validate the signature. In the preferred embodiment, however, the regular form of the signature and an examination of the signature text itself are sufficient to enable the system 60 to algorithmically recognize and then decode or decrypt the signature.

Robot Account E-mail Message Receipt Processing

Figure 4:
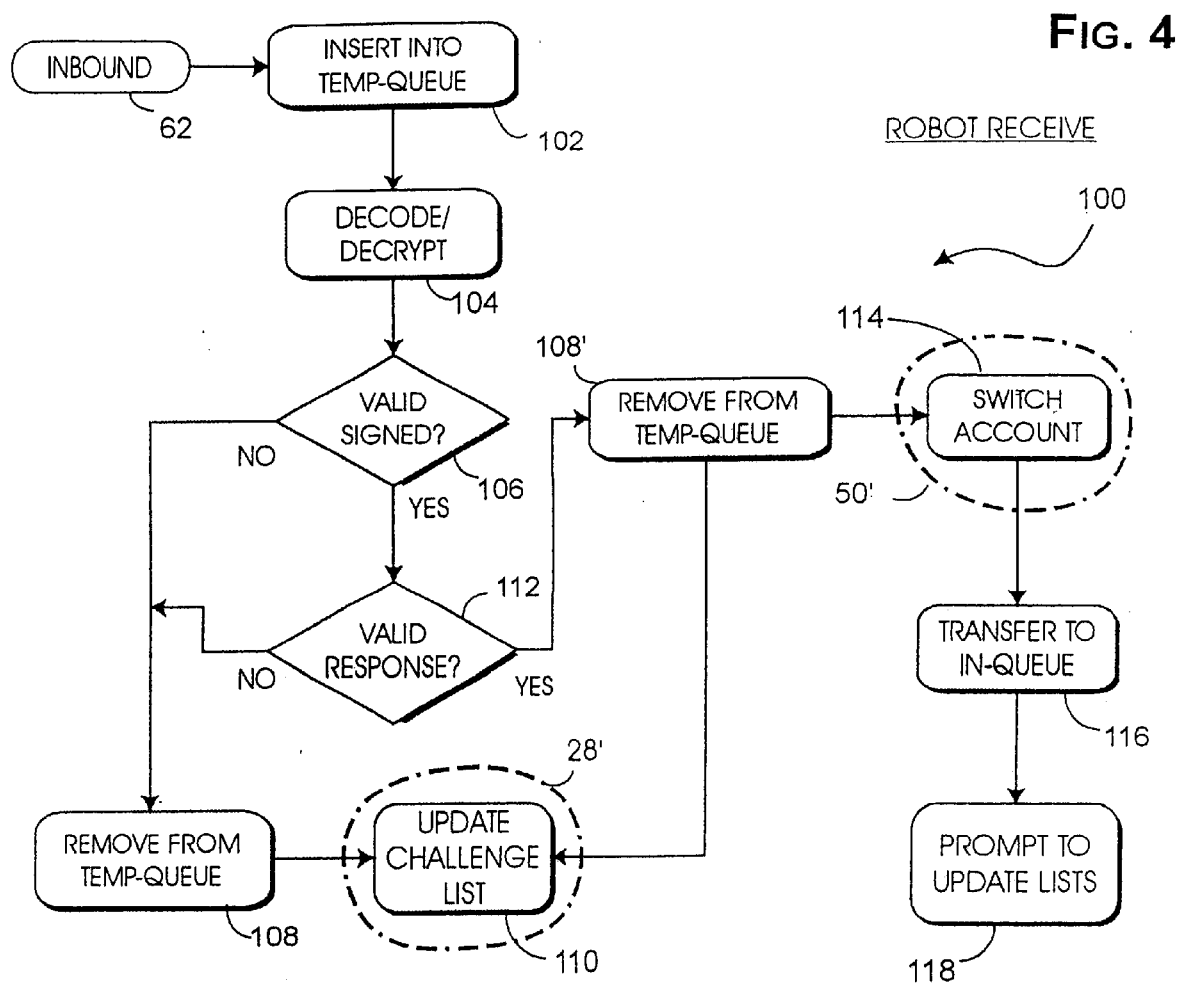
FIG. 4 is a flow diagram illustrating the details of the e-mail robot message receipt process in a preferred embodiment of the present invention.

By sending challenge e-mail messages from an alternate or "Robot" e-mail account, challenge response messages are readily segregated from the e-mail stream directed to the user of the e-mail client 22'. As shown in FIG. 4, inbound e-mail 62 directed to the robot account are received and inserted 102 into the robot account's pending box 30'. In the manner described above, the received e-mail is scanned for a digital signature that is, in turn, decoded or decrypted 104. If the signature found is invalid or if no signature is found 106, the received e-mail message is removed 108 from the pending box 30'. The challenge list 110 is correspondingly updated.

For received e-mail messages with valid digital signatures, the message is next examined for a correct response 112 to the cognitive request. If the response is either absent or incorrect, the received e-mail message is again removed 108 from the pending box 30'. When a valid cognitive response is found, the response e-mail is again discarded 108' and the challenge list is again updated 110. Processing continues, however, with the robot effectively switching e-mail accounts 114. This account switch is made to the client e-mail 22 user's account at least to the extent necessary or appropriate to enable the robot to access the pending box 30 of the user account for the purpose of transferring 116 the corresponding challenged e-mail message from the user's pending box 30 to the user's inbox 32. The robot may also automatically update the accept list 24 with the From: e-mail address of the message moved. In a preferred embodiment of the present invention, however, the robot instead provides for the active e-mail filtering client 22 to prompt the user to update either the accept 24 or reject 26 list when the e-mail message is accessed 114.

E-mail User Send Processing

Figure 5:
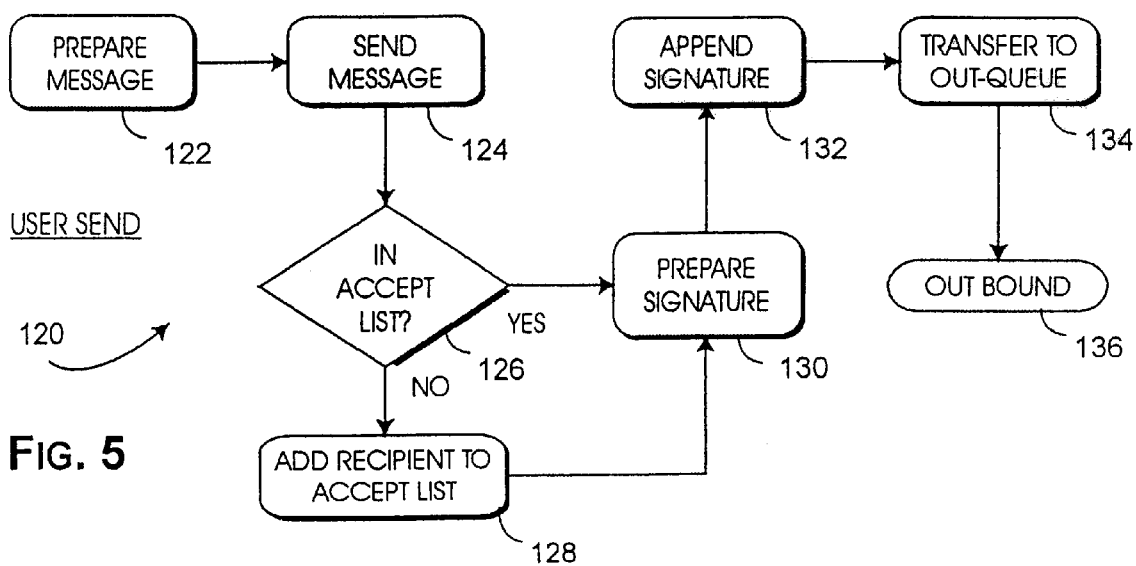
FIG. 5 is a flow diagram illustrating the details of the e-mail user message issuance process in a preferred embodiment of the present invention.

A preferred process of handling original outbound messages in accordance with the preferred embodiments of the present invention is shown in FIG. 5. The process 120 is initiated when a message is prepared 122 by the e-mail client 22'. When the message is prepared to be sent 124 by transfer 134 to the output queue 34 of the e-mail client 22, the message headers are first examined to determine whether the message qualifies as an original message. Messages identified as challenge messages are not considered original messages. Rather, new messages prepared by the e-mail user of the system 14, and ordinary reply and forward massages are considered original. The destination e-mail address specified in an original message is then matched 126 against the accept list 24 to determine whether the address has already been recorded. If not, the recipient e-mail address is added 128 to the accept list 24. This ensures that e-mail destinations implicitly recognized and validated by the user of the e-mail client system 22' are subsequently recognized as valid senders of e-mail messages to the system 22. In either event, a new digital signature is prepared 130 and appended 132 to the outbound message. Transfer of the resulting message to the out-box 134 is then complete. The outbound message, along with any other pending outbound messages are subsequently picked up or transferred 136 to the ISP servicing the e-mail client 22.

Pending Box Maintenance

Figure 6:
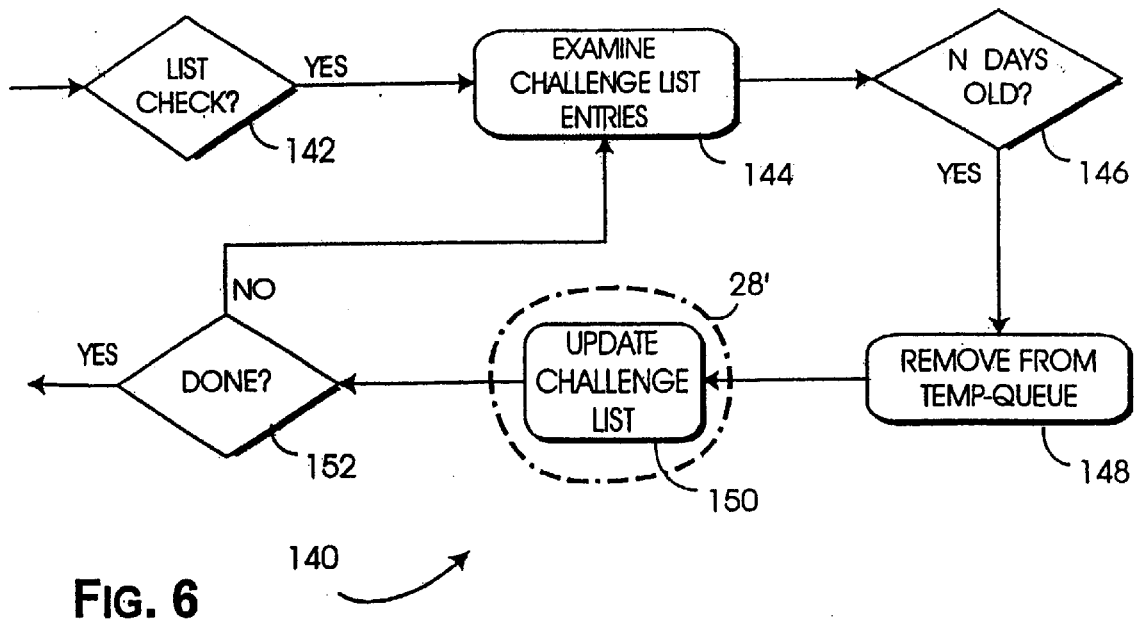
FIG. 6 is a flow diagram illustrating the details of a preferred challenge list maintenance process in a preferred embodiment of the present invention.

By selectively delaying the deliver of e-mail messages to the client e-mail system 22', the need for managing the contents of the pending box 30 arises. Preferably, as generally shown in FIG. 6, a maintenance procedure is provided to periodically 142 examine the pending box for e-mail messages corresponding to outstanding challenge messages sent by the system 14. The pending box 30 or challenge list 28 may be examined to identify such held e-mail messages 144. Preferably, as each is identified, a check is made for the date the corresponding challenge e-mail message was sent. Messages pending for more than some user defined period of time are determined 146 to be expired. The length of this user defined period may be any reasonable number of days or other measure of elapsed time, and preferably is approximately two weeks.

Expired e-mail messages are removed from the pending box 30 and discarded 148. The challenge list 28' is correspondingly updated 150. Finally, a determination is made 152 of whether the entire set of pending e-mail messages has been examined, with the result that the maintenance routine 140 either exits or continues processing challenge list entries 144.

Active Filter Accept List Initialization

Referring again to FIG. 3, in the ongoing operation of the system 60 the majority of received e-mail messages will likely be transferred 70 to the input queue 30 based on e-mail address matches against the accept list 24. In accordance with a preferred embodiment of the present invention, a quick initial development of the accept list 24 can be obtained by effective assimilation of any e-mail archives kept by the user of the system 60. Presumptively, archived e-mail messages are from or are replies to valid and acceptable e-mail correspondents.

Figure 7:
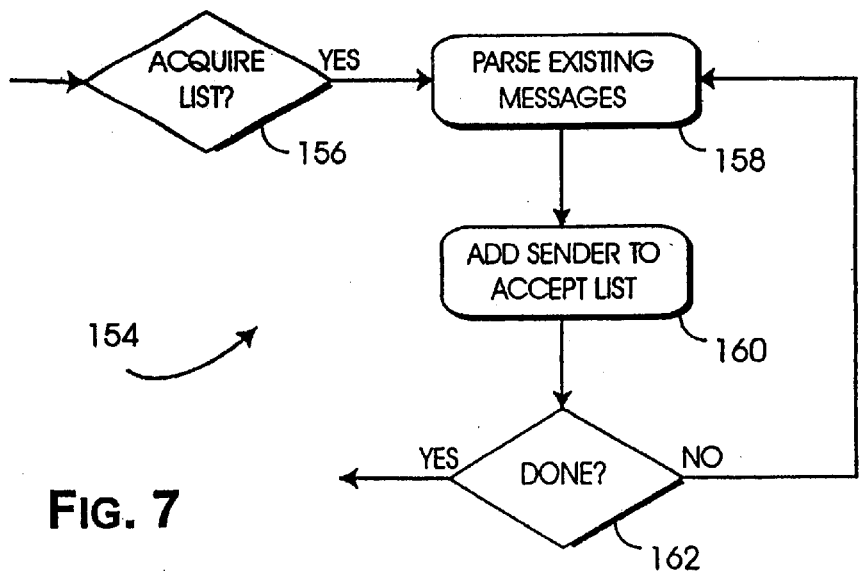
FIG. 7 is a flow diagram illustrating the details of a preferred e-mail acceptance list initialization process of the present invention.

As illustrated in FIG. 7, a process 154 is preferably provided for the user to select 156 to prepare entries for the accept list 24. A user identified e-mail archive is then parsed 158 to progressively identify the e-mail address of the correspondent or correspondents identified as the source or destination of the message, including optionally the copied correspondents. As each e-mail address is identified and determined to be unique relative to the accept list 24, the address is added 160 to the list 24. The parsing of e-mail messages continues 126 until complete or terminated by the user 162.

Summary

Thus, a method and system for providing for the effective identification and active filtering of UCE has been described. The method and system includes provisions for initialization of filtering lists and the continuing, largely automatic identification of acceptable e-mail addresses through a challenge system that utilizes signed challenges as a basis for the automation. While the present invention has been described particularly with reference to the active filtering of UCE from public e-mail transferred through Internet based message streams, the present invention is equally applicable to intranets, virtual private networks, and other communication networks not easily controlled by a master addressing authority.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

What is claimed is:

1. A method of filtering e-mail comprising the steps of:
   a) determining an e-mail source address from a message;
   b) accepting said message by a first computer where said source address is known to a second computer;
   c) (i) autonomously issuing an e-mail message to said source address where said source address is unknown to said second computer, said e-mail message including predetermined data for use in identifying a response message, said predetermined data including a challenge request having a text statement and a digital signature;
   (ii) delaying acceptance of said message by said first computer where said source address is unknown to said second computer until predetermined criteria are met, wherein a first predetermined criteria includes receipt of said response message with a modification to said text statement and with said digital signature.

2. The method of claim 1 wherein said step of accepting is qualified as accepting said message by said first computer where said source address is known to said second computer by reference to a first list, said method further comprising the step of discarding said message where said source address is known to said second computer by reference to a second list.

3. The method of claim 1 or 2 further comprising the step of accepting said response message where said response message includes derived data corresponding to said predetermined data.

4. The method of claim 3 wherein acceptance of said response message causes said source address to become known to said second computer and said message to be accepted by said first computer.

5. The method of claim 4 further comprises the step of validating the correspondence of said derived data to said predetermined data.

6. The method of claim 5 wherein said step of validating determines the validity of the correspondence based on said predetermined data and other predetermined data wherein said other predetermined data is determined by said second computer independent of said message.

7. The method of claim 5 wherein said step of delaying includes the step of discarding said message when said predetermined criteria cannot be met.

8. The method of claim 7 wherein said first and second computers are the same computer.

9. The method of claim 7 wherein said second computer operates as a spam firewall for a network of computers including said first computer.

10. A spam filter system for blocking the acceptance of e-mail from unverifiable sources, said system comprising:
    a) a filtering computer system coupleable to a network for the exchange of e-mail messages; and
    b) a repository coupleable to said filtering computer system that stores first and second e-mail source lists, wherein said filtering computer system accepts receipt of e-mail having an e-mail source identified on said first e-mail source list, rejects receipt of e-mail having an e-mail source identified on said second e-mail source list, and accepts receipt of e-mail including predetermined data, wherein said predetermined data includes receipt of a response message with a modified text statement and with a digital signature.

11. The spam filter system of claim 10 wherein said filtering computer system holds a predetermined e-mail having an unverified e-mail source unidentified on said first and second e-mail source lists and wherein said predetermined e-mail is held for acceptance subject to predetermined criteria, which includes subsequent receipt of e-mail including said predetermined data.

12. The spam filter system of claim 11 wherein a challenge e-mail is issued by said spam filter system in response to the receipt of said predetermined e-mail, said challenge e-mail being issued to said unverified e-mail source, said challenge e-mail including a predetermined challenge.

13. The spam filter system of claim 12 wherein said predetermined data is a function of said predetermined challenge and wherein said unverified e-mail source is recorded on said first e-mail source list following receipt of e-mail, including said predetermined data, from said unverified e-mail source.

14. The spam filter system of claim 13 wherein said unverified e-mail source is recorded on said second e-mail source list following failure to receive said predetermined data from said unverified e-mail source.

15. The spam filter system of claim 14 wherein said predetermined e-mail is rejected following failure to receive said predetermined data from said unverified e-mail source.

16. A method of operating a computer for the purpose of validating the origin address of an e-mail message to enable blocking of e-mail from spam e-mail sources, said method comprising the steps of:
    a) preparing, in response to the receipt of a predetermined e-mail message from an unverified source address, a data key encoding information reflective of some aspect of said predetermined e-mail message;
    b) issuing a challenge e-mail message including said data key to said unverified source address; and
    c) detecting whether a response e-mail message, responsive to said challenge e-mail message, is received and whether said response e-mail message includes a response key encoding predetermined information reflective of a predetermined aspect of said challenge e-mail message.

17. The method of claim 16 further comprising the steps of:
    a) recording, in response to receipt of said responsive key, said unverified source address in a verified source address list; and
    b) accepting receipt of a predetermined e-mail message on condition that the source address of said predetermined e-mail message is recorded in said verified source address list and alternatively on condition that said predetermined e-mail message includes said response key.

18. The method of claim 17 wherein said response key is provided in said challenge e-mail message so as to be returned with any automatic return of said challenge e-mail message as said response e-mail message.

19. A system for discriminating between messages categorizable as first or second message types exchangeable between first and second computer systems via a communications network, wherein messages are directed from originators to recipients, said system comprising:

a) an authentication computer system associated with a predetermined recipient, said authentication computer system being coupleable to said communications network to allow receipt of a predetermined original message directed to said predetermined recipient;

b) a database of identified originators operable to provide a determination of whether a predetermined originator is identified in said database, said determination being accessible by said authentication computer system, wherein said authentication computer system includes means, responsive to the state of said determination, for issuing a predetermined reply message to said predetermined originator, said predetermined reply message including an encoded digital predetermined signature, and means, responsive to the receipt of a predetermined response message including data derived from said predetermined signature, for validating said data and causing said predetermined originator to be added to said database.

20. The system of claim 19 wherein said predetermined signature encodes data specific to said predetermined reply message and wherein said validating means determines whether said data and said predetermined response message are validly responsive to said predetermined reply message, an affirmative determination enabling said authentication computer system to provide for the addition of said predetermined originator to said database.

21. The system of claim 20 wherein said database includes first and second lists of identified originators, wherein said validating means categorizes said predetermined message as a first message type when said predetermined originator is included in said first list of identified originators, wherein said validating means categorizes said predetermined message as a second message type when said predetermined originator is included in said second list of identified originators, and wherein said authentication computer system provides for retaining messages of said first message type and provides for discarding messages of said second message type.

22. The system of claim 21 wherein said predetermined signature encodes a predetermined portion of said predetermined reply message and wherein said validating means identifies said predetermined portion from said data in determining whether the predetermined response message is valid.

23. The system of claim 22 wherein said predetermined signature further encodes a first date and wherein said validating means compares said first date with a second date in determining whether the predetermined response message is valid.

24. The system of claim 23 wherein the derived relationship between said data and said predetermined signature is operatively defined by information provided by said means for issuing in said predetermined reply message.

* * * * *